US012587568B2

(12) United States Patent
Mishra Gupta et al.

(10) Patent No.: US 12,587,568 B2
(45) Date of Patent: Mar. 24, 2026

(54) GENERATION OF SECURITY POLICIES FOR CONTAINER EXECUTION

(71) Applicant: INTERNATIONAL BUSINESS MACHINES CORPORATION, Armonk, NY (US)

(72) Inventors: Shachee Mishra Gupta, Ghaziabad (IN); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 691 days.

(21) Appl. No.: 17/929,103

(22) Filed: Sep. 1, 2022

(65) Prior Publication Data

US 2024/0080342 A1     Mar. 7, 2024

(51) Int. Cl.
| | |
|---|---|
| *H04L 9/40* | (2022.01) |
| *H04L 41/08* | (2022.01) |
| *H04L 41/0816* | (2022.01) |

(52) U.S. Cl.
CPC .......... H04L 63/20 (2013.01); H04L 41/0816 (2013.01); H04L 41/0883 (2013.01)

(58) Field of Classification Search
CPC .. H04L 63/20; H04L 41/0816; H04L 41/0883
See application file for complete search history.

(56) References Cited

U.S. PATENT DOCUMENTS

| | | | |
|---|---|---|---|
| 8,499,353 B2 * | 7/2013 | Lockhart | ............. G06F 11/3612 726/25 |
| 10,261,782 B2 | 4/2019 | Suarez et al. | |

(Continued)

FOREIGN PATENT DOCUMENTS

| | | |
|---|---|---|
| CN | 114461300 A | 5/2022 |

OTHER PUBLICATIONS

"System and Method for Migrating between Container Orchestration Solutions", IP.com No. IPCOM000268969D, Electronic Publication Date: Mar. 14, 2022, 8 pgs.

*Primary Examiner* — Sm A Rahman
(74) *Attorney, Agent, or Firm* — Aaron Pontikos, Esq.; Matthew M. Hulihan, Esq.; Heslin Rothenberg Farley & Mesiti P.C.

(57)     ABSTRACT

Automated generation of security policies for container execution includes performing automated static analysis of binary code of a containerized application and generating, based on the static analysis, a control-flow graph of expected runtime execution flow of the containerized application, the containerized application providing an expected set of functionality when properly executing, inferring, from the expected runtime execution flow of the containerized application, security policy configurations for a plurality of resources used in execution of the containerized application and that suffice for the containerized application to provide the expected set of functionality, and automatically generating, as part of configuration file(s) used in deploying a container having the containerized application for execution, a security policy for execution of the container including the containerized application thereof, the security policy specifying the security policy configurations for the plurality of resources used in the execution of the containerized application.

20 Claims, 5 Drawing Sheets

(56) References Cited

U.S. PATENT DOCUMENTS

| | | | |
|---|---|---|---|
| 10,572,226 B2 | 2/2020 | Biskup et al. | |
| 10,943,014 B2 * | 3/2021 | Stopel | G06F 21/53 |
| 11,321,218 B1 * | 5/2022 | Hicks | G06F 8/53 |
| 11,575,693 B1 * | 2/2023 | Muddu | G06F 40/134 |
| 2012/0151453 A1 * | 6/2012 | Finking | G06F 11/3624 |
| | | | 717/130 |
| 2020/0257810 A1 * | 8/2020 | Vrabec | G06F 21/53 |

* cited by examiner

Pruned
CFG
314

Startup
command
309

Artifact
fields
316

GENERATION OF SECURITY POLICIES FOR CONTAINER EXECUTION

BACKGROUND

A container is a standard unit of software that packages code and dependencies so that an application runs quickly and reliably from one computing environment to another. Containers isolate software from its environment and ensure that it works uniformly despite differences between development and staging, for instance. Container orchestration platforms allow users to configure specific security settings surrounding execution of the container and its contents.

SUMMARY

Shortcomings of the prior art are overcome and additional advantages are provided through the provision of a computer-implemented method. The method performs automated static analysis of binary code of a containerized application and generates, based on the static analysis, a control-flow graph of expected runtime execution flow of the containerized application. The containerized application provides an expected set of functionality when properly executing. The method further infers, from the expected runtime execution flow of the containerized application, security policy configurations for resources used in execution of the containerized application and that suffice for the containerized application to provide the expected set of functionality. Additionally the method automatically generates, as part of configuration file(s) used in deploying a container having the containerized application for execution, a security policy for execution of the container including the containerized application thereof. The security policy specifies the security policy configurations for the resources used in the execution of the containerized application.

Further, a computer system is provided that includes a memory and a processor in communication with the memory, wherein the computer system is configured to perform a method. The method performs automated static analysis of binary code of a containerized application and generates, based on the static analysis, a control-flow graph of expected runtime execution flow of the containerized application. The containerized application provides an expected set of functionality when properly executing. The method further infers, from the expected runtime execution flow of the containerized application, security policy configurations for resources used in execution of the containerized application and that suffice for the containerized application to provide the expected set of functionality. Additionally the method automatically generates, as part of configuration file(s) used in deploying a container having the containerized application for execution, a security policy for execution of the container including the containerized application thereof. The security policy specifies the security policy configurations for the resources used in the execution of the containerized application.

Yet further, a computer program product including a computer readable storage medium readable by a processing circuit and storing instructions for execution by the processing circuit is provided for performing a method. The method performs automated static analysis of binary code of a containerized application and generates, based on the static analysis, a control-flow graph of expected runtime execution flow of the containerized application. The containerized application provides an expected set of functionality when properly executing. The method further infers, from the expected runtime execution flow of the containerized application, security policy configurations for resources used in execution of the containerized application and that suffice for the containerized application to provide the expected set of functionality. Additionally the method automatically generates, as part of configuration file(s) used in deploying a container having the containerized application for execution, a security policy for execution of the container including the containerized application thereof. The security policy specifies the security policy configurations for the resources used in the execution of the containerized application.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for automated generation of security policies for container execution. The security policies may be specified in examples as part of configuration files/deployment artifacts that a container orchestration system uses to orchestrate container deployment and execution.

Kubernetes® is an open source container orchestration system/platform (KUBERNETES is a registered trademark of The Linux Foundation, San Francisco, California, USA). With Kubernetes® becoming increasingly popular with enterprises, securing the container deployments becomes a challenge. Deploying applications to Kubernetes® comes with a steep learning curve. Deploying to enterprise-ready products like Red Hat® OpenShift® comes with additional work (RED HAT and OPENSHIFT are registered trademarks of Red Hat, Inc., Raleigh, North Carolina, USA). The additional work includes, as one example, creation of configuration files used by OpenShift® and/or Kubernetes® for container execution. The configuration files might specify security policies to use for container execution. More specifically, they might dictate specific policies ("security configurations" as used herein) with respect to specific resources used in execution of a containerized application. The resources can be any of various hardware and/or software utilized in execution of the application. Example security configurations include, but are not limited to, those dealing with network stack and port usage, file and volume access, privilege escalation, system call availability, inter-process communication, and sharing of host process identifier namespace, as examples. Many other resources and security configurations thereof can exist.

In the context of Kubernetes®, a 'pod' is a group of one or more containers with shared storage and network resources, and a specification for how to run the containers. Pod security policies may be manually created/edited. In many situations, a default policy that is set initially locks-down security to the point where the application is unable to execute properly or at all. To enable application execution, administrators or other users often take the easy approach of relaxing permissions, privileges, and other security controls to provide the ability for the application to execute but with much more relaxed and permissive security than is needed, desired, and/or best practice. This provides a quick and easy fix to the problem but violates the "principal of least privilege" (PoLP), which seeks to control access and limit the application and modules thereof to the information and resources that are necessary for the application's legitimate purpose.

Figure 1:
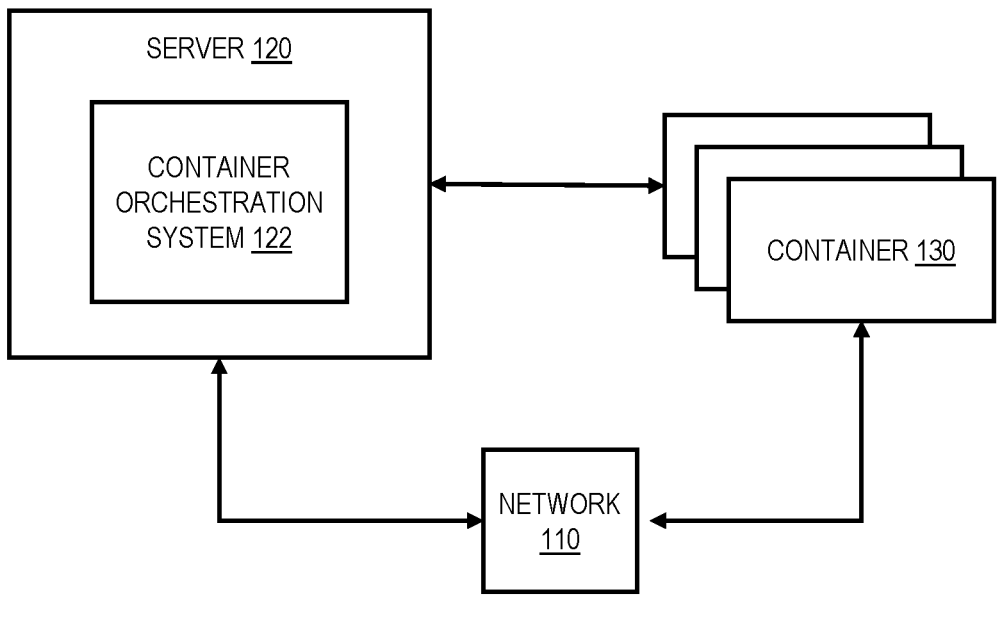
FIG. 1 depicts an example container environment in accordance with aspects described herein.

For context, FIG. 1 depicts an example container environment 100 in accordance with aspects described herein. FIG. 1 provides only an illustration of one embodiment, and does not imply any limitations with regard to the environments in which different embodiments of aspects described herein may be implemented.

In the depicted embodiment, environment 100 includes server 120 and containers 130 interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 120 and containers 130. Environment 100 may include additional servers, computers, or other devices not shown.

Server 120 operates to run container orchestration system 122. Server 120 could, in some embodiments, run additional system(s)/components, for instance system(s) for network monitoring, database(s) and related systems, and so on. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of communicating with containers 130 via network 110. In some embodiments, server 120 represents a server computing system utilizing multiple computers as a server system, such as in a cloud computing environment. In some embodiments (not shown), container orchestration system 122 and other constituent systems/components of server 120 may be housed on separate servers and/or computing devices that all have access to network 110. Server 120 may include components as described in further detail in other figures herein, such as hardware/software components to implement aspects of FIGS. 2, 3, and 4A-4B, as examples.

Container orchestration system 122 operates to manage the lifecycles of containers, i.e., containers 130. In general, a container orchestration system controls and automates tasks including, but not limited to, provisioning and deployment of containers, redundancy and availability of containers, allocation of resources between containers, movement of containers across a host infrastructure, and load balancing between containers. In the depicted embodiment, container orchestration system 122 resides on server 120, though in other embodiments container orchestration system 122 may reside partially or wholly on another computing device (not shown) that has access to network 110.

A monitoring system executing on server 120 or elsewhere (not pictured) could operate to learn about container deployments, for instance those made across a cluster of nodes, to learn about the security policies and security configurations for resources as specified therein for the various container deployments. This learning could be aided by artificial intelligence, such as an AI learning model. Learning via training can inform best and/or desired security configurations, particularly in situations where there might be multiple options to use as the security configuration for a resource to achieve a desired policy. The model can use feedback to incrementally or continually refine the model.

Containers 130 operate as packaged units of software for running an application that are managed by container orchestration system 122. Containers 130 may include containers from multiple customers of a cloud service provider. In an embodiment, containers 130 are running on hardware, i.e., servers, and/or virtual machines (VMs) and can be moved by container orchestration system 122 between hardware and/or VMs as desired.

In accordance with aspects described herein, information derived from the container binary code, based or instance on static and dynamic (runtime) analysis thereof, is used to automatically generate secure deployment configuration in the form of a security policy that adheres to organizational practices. For instance, aspects provide automatic security policy generation to define policies that provide only what the application legitimately needs for proper execution. Some aspects described herein provide systems and processes to automatically generate tight security-hardened deployment artifacts/security policies. Prior to deployment of a containerized application, a process has access to information about the application, for instance binary code, that can be analyzed (as part of static analysis, for instance) to learn about the application. Deployment configuration file(s) with a security policy is/are ultimately to be produced. A system can analyze container images and produce deployment configurations with sufficient (and not unnecessarily loose) permissions and other security policy settings to enable the application to provide an expected/desired set of functionality. A given containerized application might be executed in different modes and/or initiated with different parameters to control its execution, and in this sense the same application might require a different security policy from one execution to the next depending on how it is to be executed. Therefore, the parameterized startup of the container can be relevant to what the proper security policy is to be for that deployment.

Accordingly, some aspects extract control-flow graphs and create profiles based on the expected control at runtime. The control-flow graph (CFG) provides the expected runtime execution flow of the containerized application, indicating for instance in what sequence the application portions and functions execute. A full CFG can be large and robust, particularly in situations where there are hundreds or thousands of functions of the application with complex flow sequences between them.

In addition to the above, and as noted, a system can learn from other deployments (for instance those within a same cluster) to prioritize which options to use in situations where there are multiple available options to use as the security configuration for a resource. Sometimes other deployments in the cluster can inform of environmental and other factors (that might impact branches, jumps, etc. for instance), which might not be discernible from analysis of the binary alone.

In situations where a deployment is being made to a cluster with other deployments already made, those other deployments can be analyzed during their runtime to learn whether the policies used were appropriate. By way of specific example, a resource mighty be a particular file and the access needed might be write access to the file. There could be multiple ways (options) of controlling such write access. When deploying a containerized application at hand, referring to the options used for other deployment instances within the cluster (or other similar containers deployed in the cluster or even elsewhere) could provide useful training for a model to select a proper option to use for file write access for this deployment instance. Accordingly, a preferred security configuration for a resource for which there are multiple options to use as the security configuration for the resource could be learned from additional container deployment(s) of the cluster or other deployments made elsewhere, and the learned, preferred configuration could be selected as the security configuration for the resource.

A security policy with security configurations for resources can be specified in different ways and by way of different features. One example is use of pod security policies. A pod security policy (PSP) specifies a list of restrictions, requirements, and defaults for a pod created under the security policy. The ability to run privileged containers and control privilege escalation, access to host filesystems, usage of volume types, and a default secure computing mode (seccomp) profile to apply to containers are all examples, among many others, of items controllable by a pod security policy (PSP).

As another example, and an alternative to PSP, external tools referred to as 'external admission controllers' can be used by a container deployment platform to specify security policies. K-Rail, Kyverno, and OPA Gatekeeper are all examples of such external tools.

Solutions to specify and provide the security policy generally require a list of security constraints in the form of one or more configuration files that are then enforced for container execution.

A problem exists in that the effectiveness and security offered depends on the privilege constraints and other security configurations provided by the user. None of the current security policy tools infer proper security configurations in an automated manner, and consequently there is significant reliance on manual efforts to extract the least privilege constraints required to successfully run the application. Often this results in a user providing more than is needed in terms of access and privilege, resulting in a security risk.

In accordance with some aspects, a process reads through an application binary (program code) and included default configuration artifacts (such as in the YAML format) for a container that contains one or more containerized applications. The reading may be any kind of analysis to capture program flow occurring in the execution of the container. Typically, though not always, each application of a deployment would be containerized in its own container with its own artifacts and policies. An example of this 'reading' is static analysis and/or dynamic tracing as described herein. The process also looks for different roles in the application and the roles' associated permissions to various resources. As an example permission with respect to a file system group (FSGroup), the process would identify the minimum group identifier(s) needed to access a certain volume. By default this might be set to 'RunAsAny', which is potentially overinclusive of the what is needed for proper application execution. Extensive permissive policies provide a large attack surface and are a security risk. In accordance with aspects described herein, a tool can automatically create appropriate security policies according to each role for each application deployment.

Below is a portion of an example configuration (YAML) file with some security configurations for resources. This configuration file may be a default or starting point prior to generation of a security policy in accordance with aspects described herein. The generating could edit such a default security policy with prior-generated security policy configurations, if desired. The editing could change the prior-generated security policy configurations to implement alternative configurations identified by processes discussed herein. Alternatively, aspects might generate such policy from scratch without editing/working from another configuration file.

Before Configuration File: (partial, showing portion of security policy)

```
privileged: true
allowPrivilegeEscalation: true
allowedCapabilities:
  - '*',
volumes:
  - '*',
hostNetwork: true
hostPorts:
  - min: 0 -
  - max: 65535
hostIPC: true
hostPID: true
runAsUser:
  rule: 'RunAsAny'
seLinux:
  rule: 'RunAsAny'
supplementalGroups:
  rule: 'RunAsAny'
```

This above depicts just some of the security policy; other resources with corresponding configurations might be specified, for instance the fsGroup resource with a configuration of 'RunAsAny' as discussed above.

An example edited version of the security policy above, edited based on applying principles and aspects discussed herein, is show below:

After Configuration File: (partial, showing portion of security policy with detailed configurations specified)

```
privileged: false
# Required to prevent escalations to root.
allowPrivilegeEscalation: false
requiredDropCapabilities:
- All
#Allow core volume types.
volumes:
  - 'configMap'
  - 'emptyDir'
  - 'projected'
```

-continued

```
    - 'secret'
    - 'downwardAPI'
#Assume that ephemeral CSI drivers & persistentVolumes set up by the cl
    - 'csi'
    - 'persistentVolumeClaim'
    - 'ephemeral'
hostNetwork: false
hostIPC: false
hostPID: false
runAsUser:
    #Require the container to run without root privileges.
    rule: 'MustRunAsNonRoot' <--- this particular security configuration
setting/rule is a natively understood/supported setting
seLinux:
    #This policy assumes the nodes are using AppArmor rather than SELinux.
    rule: 'RunAsAny'
supplementalGroups:
    rule: 'MustRunAs'
```

In the example above, security policy configurations of resources explicitly specify restrictions on container network stack and port usage, file and volume access, privilege escalation, interprocess communication, and sharing of host process identifier namespace, among other resources.

It is noted that the generating of the policies might expand on and/or add some configurations that were not initially set to another value.

In one embodiment, for each policy resource to have a security configuration set therefor, a tool automatically creates pod-specific profiles to provide a strong set of security defaults while preserving the functionality of the workload. The tool analyzes the application to create runtime profiles and produces a new (or modifies existing) YAML or other configuration file(s) to set proper security configurations for various resources.

Seccomp profiles can used to restrict system calls (syscalls) made from the container. A default profile could be 'Unconfined', meaning there is no restriction on the available syscalls (there are hundreds of available syscalls). A targeted profile, however, will specify a subset of those syscalls. The setting:

seccomp.security.alpha.kubernetes.io/allowedProfile-
    Names: 'docker/default,runtime/default' is an example
    setting of allowed profile names.

A specific example of a seccomp profile and specification is as follows. Initially, a segment of a container configuration file (e.g. in YAML) is provided as:

```
securityContext:
    seacompProfile:
        type: Localhost
        localhostProfile: profiles/fine-grained.json
``` in which the configuration file references a .json file with the fine-grained specification of the syscalls to be made available. The content of the example son file is as follows:

```
"syscalls": [
    }
        "names": [
        "accept4",
        "epoll_wait",
        "pselect6",
        "futex",
        "madvise",
        "epoll_ctl",
```

-continued

```
        "getsockname",
        "setsockopt",
        "vfork",
        "mmap",
        "read",
        "write",
        "close",
        "arch_prctl",
        "sched_getaffinity"
        ],
        "action": "SCMP_ACT_ALLOW"
    }
]
```

By the above, only the syscalls laid out in the list ("names") are allowed to execute.

Figure 2:
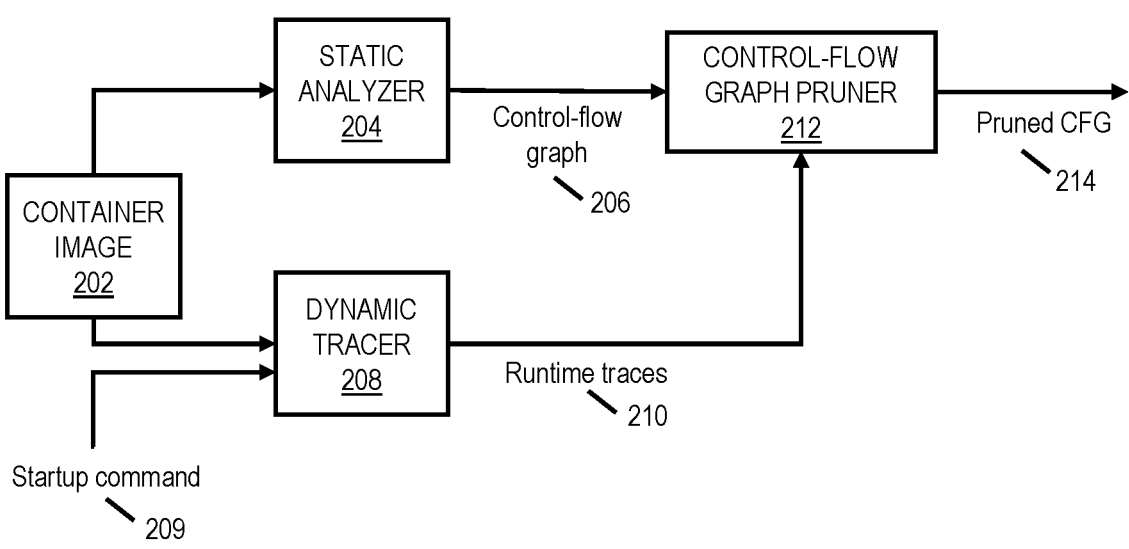
FIG. 2 depicts a conceptual diagram of example control-flow graph generation, in accordance with aspects described herein.

FIG. 2 depicts a conceptual diagram of example control-flow graph generation, in accordance with aspects described herein. The conceptual diagram encompasses a process of actions that could be performed, for instance automatically, by one or more computer systems as described herein.

For a given container image 202, the process produces a control-flow graph. Specifically, a static analyzer 204 processes/analyzes/examines the binary of the container image to learn the expected flow of application execution when the application executes. From this, a control-flow graph (CFG) 206 of the expected runtime execution flow of the application is generated. In this regard, the application provides an expected set of functionality when it properly executes. The expected set of functionality refers to what the application is expected to do perform when it performs properly under the given startup parameters, which might vary depending on how the application is to be executed on a given deployment.

By way of a specific example of static analysis, an LLVM executable lifter might be applied against an application executable to produce LLVM bitcode (that may optionally be disassembled to human-readable LLVM bitcode). An LLVM analysis of the bitcode can then be performed to generate a list of syscalls used (e.g. malloc( ) @open( ) etc.) by the application.

It is noted that different startup conditions can affect execution flow and therefore runtime behavior might be useful to better understand actual application execution. In an effort to further refine the CFG, a dynamic tracer 208 component can be used to execute the application to observe how the application behaves during runtime and under a given startup parameterization 209. Specifically, runtime traces may be provided along with the control-flow graph from static analysis to a control-flow graph pruner 212 that prunes the CFG from the static analysis. The traces identify what actually occurred in terms of execution flow under the given startup parameterization of the container. Additionally, the startup command might contain information that itself immediately informs a security configuration. By way of specific example, the startup command might identify 'configMap' as being the only volume needed for execution of the application from a volume resource standpoint. In this case, the generated security policy could indicate just config-Map' as the volume needed. An output of the pruner 212 is a pruned CFG 214.

Accordingly, in some aspects, the control-flow graph of expected runtime execution flow is an initial control-flow graph (206) produced from the static analysis, and a process dynamically traces containerized application execution during runtime based on a parameterized startup of the containerized application execution, generates runtime trace(s) of the containerized application execution based on this dynamically tracing, and prunes the initial control-flow graph based on the runtime trace(s) to refine the expected runtime execution flow of the containerized application. This pruning provides a pruned CFG (214).

From expected runtime execution flow, for instance as identified in a CFG, such as CFG 206 and/or CFG 214, can be inferred security policy configurations for resources used in execution of the containerized application and that suffice for the containerized application to provide the expected set of functionality, as described further herein.

Figure 3:
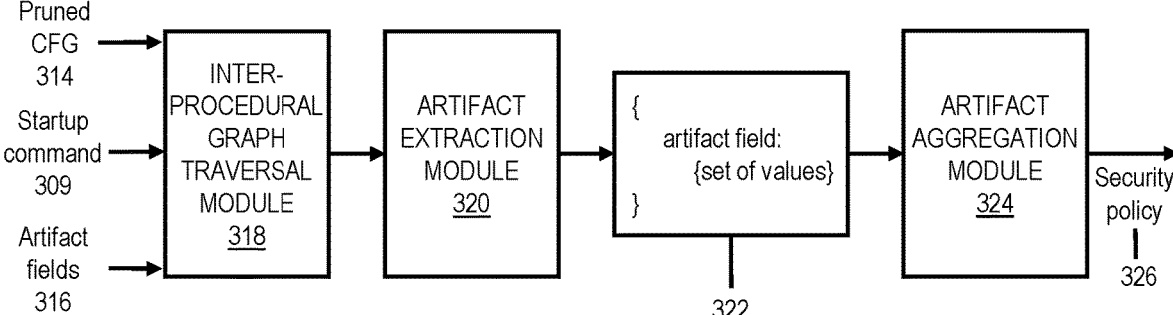
FIG. 3 depicts a conceptual diagram of example security policy generation, in accordance with aspects described herein.

FIG. 3 depicts a conceptual diagram of example security policy generation, in accordance with aspects described herein. A pruned CFG 314 (such as pruned CFG 214 of FIG. 2) is provided as input along with startup command 309 and artifact fields 316 (e.g. of resources, referred to here as artifacts, that might be used in the security policy) into an inter-procedural graph traversal module 318. The Inter-procedural graph traversal module 318 identifies artifact use (where the artifact field is being in the execution flow) and how execution flow might eventually reach that point of execution. There could be multiple ways to reach a certain point of execution where the artifact is used. Meanwhile, there may be multiple different ways in which an artifact is used, informed by, for example, the syscalls made relative to the resource. Artifact extraction module 320 extracts, for each artifact, how the used and the various different security configuration values that would be necessary to use the resource in such ways. This produces a specification 322 for each artifact and corresponding set of security configuration values. Then an artifact aggregation module 324 collects this information about the different artifacts and aggregates it into a single form (e.g. specification) to produce a security policy 326 for inclusion in configuration file(s)/deployment artifacts for the container 202. It is noted that a different security policy might be generated if a different startup parameterization 309 were specified. By way of specific example, if a parameter specified for container startup and execution is a particular storage volume name against which to process the application, then the particular security policy might include a security configuration limiting storage volume access to only the storage volume of that particular storage volume name.

In this manner, from the expected runtime execution flow of the containerized application, security policy configurations for the resources used in execution of the containerized application and that suffice for the containerized application to provide the expected set of functionality can be inferred by identifying different roles associated with the container-ized application and permissions to various resources under various execution flow scenarios and aggregating the different roles and permissions to determine minimum security policy configurations sufficient for the containerized application to provide the set of functionality that is expected. This provides automated generation of the security policy for provision as part of configuration file(s) used in deploying the container having the containerized application for execution.

With the security policy generated, deployment/orchestration processing can take the steps of using the security policy in deploying the container to a container execution environment for execution according to the security policy.

Aspects described herein make it easier for applications to onboard to enterprise-ready clusters, such as those on Open-Shift®., and allow creation of more secure deployments through automated security policy generation with reduced user effort. In some specific embodiments, a tool implementing aspects described herein can be part of a container platform, such as the OpenShift® platform, and can enable customers to create their own secure deployments with proper security configurations that do not give greater security permissions and other configurations than necessary for the application to execute and provide proper functionality.

Figure 4A:
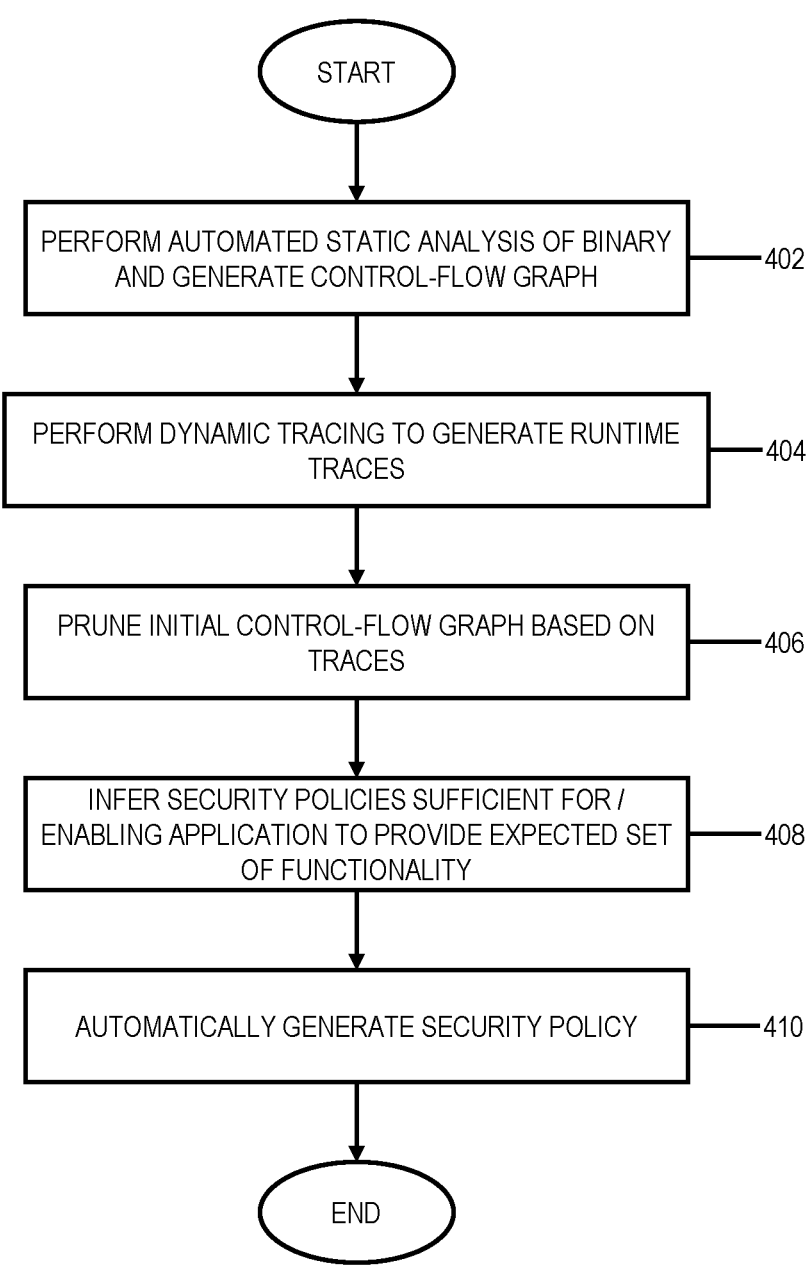
FIGS. 4A-4B depict example processes for automated generation of security policies for container execution, in accordance with aspects described herein.
Figure 4B:
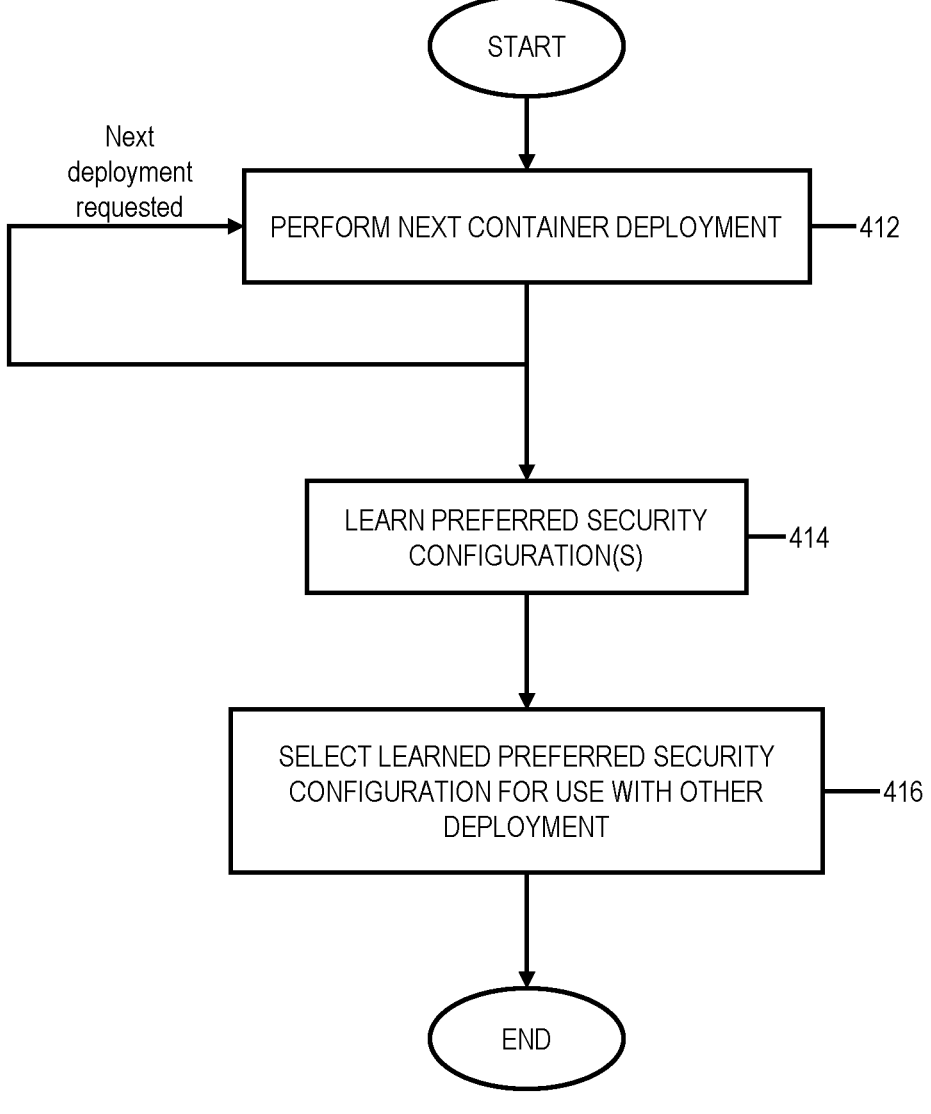
Figure 5:
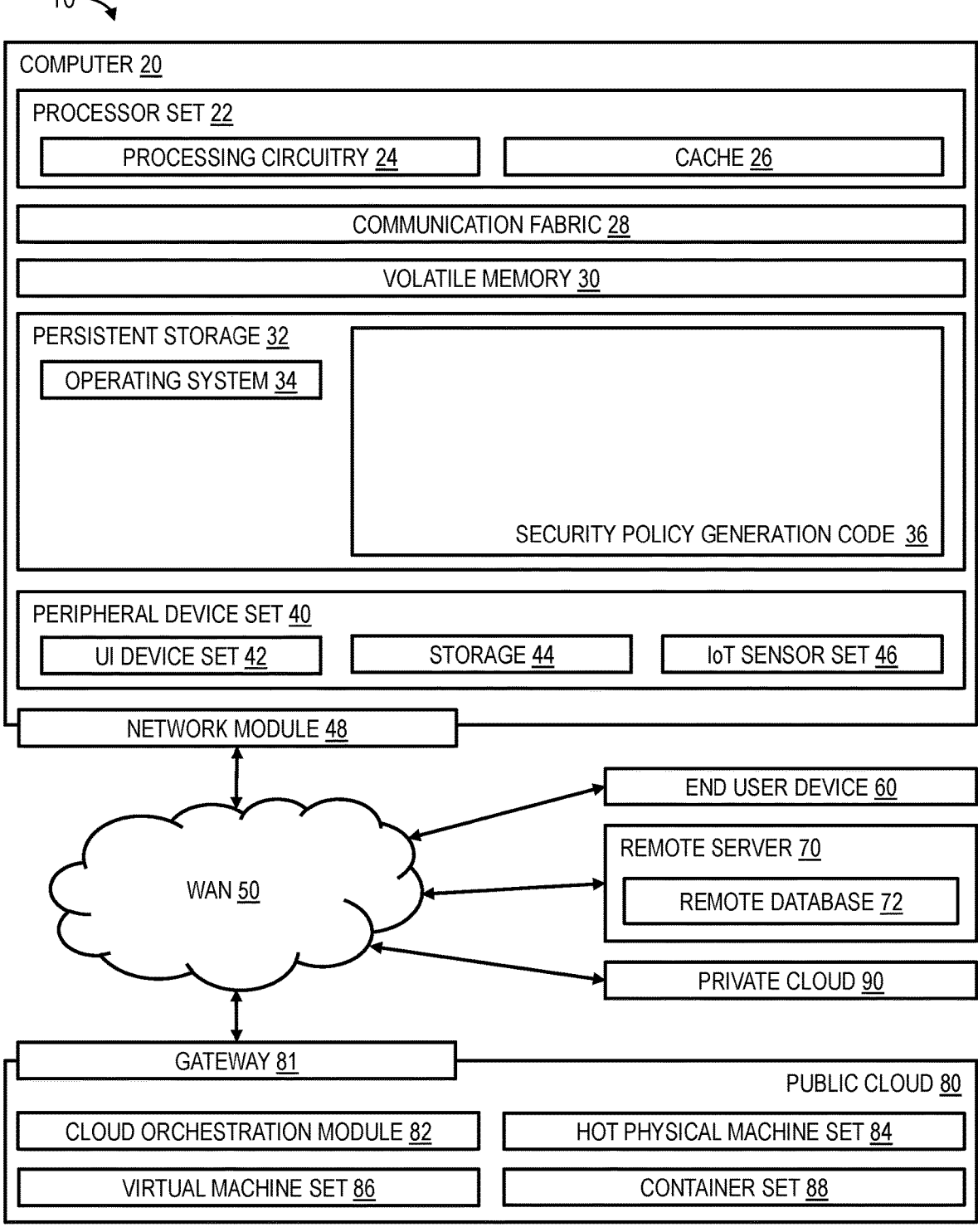
FIG. 5 depicts an example environment to incorporate and use aspects described herein.

FIGS. 4A-4B depict example processes for automated generation of security policies for container execution, in accordance with aspects described herein. In some examples, aspects of the processes are performed by one or more computer systems, such as those described herein. Referring initially to FIG. 4A, which depicts an example process to analyze binary code and generate a security policy, the process begins by performing (402) automated static analysis of binary code of a containerized application, and generating, based on the static analysis, a control-flow graph of expected runtime execution flow of the containerized application. The containerized application provides an expected set of functionality when properly executing, meaning when the application is able to execute as it is intended to execute (e.g. given the resources and access it expects to have to execute as intended).

In some embodiments, this control-flow graph of expected runtime execution flow is an initial control-flow graph and it is desired to refine this control-flow graph. Thus, the process in this example proceeds by dynamically tracing (404) containerized application execution (i.e. the execution of the containerized application) during runtime thereof and based on a parameterized startup of the containerized application execution, to generate one or more runtime traces of the containerized application execution based on the dynamically tracing. Using these and the initial control-flow graph, the process continues by pruning (406) the initial control-flow graph based on the one or more runtime traces to refine the expected runtime execution flow of the containerized application. The pruning provides a pruned control-flow graph.

The process of FIG. 4A proceeds by inferring (408), from the expected runtime execution flow of the containerized application, security policy configurations for a plurality of resources used in execution of the containerized application, the security policy configurations that are inferred being sufficient for the containerized application to provide the expected set of functionality. A goal may be to infer security configurations that enable the application to provide this functionality without giving excess or unnecessary security and access privileges. In situations where a pruned control-flow graph is generated, the inferring is made against the expected runtime execution flow as provided by the pruned control-flow graph.

In specific examples, the inferring can include identifying different roles associated with the containerized application and permissions to various resources under various execution flow scenarios, and aggregating the different roles and permissions to determine minimum security policy configurations sufficient for the containerized application to provide the expected set of functionality.

Continuing with FIG. 4A, the process automatically generates (410), as part of one or more configuration files used in deploying a container having the containerized application for execution, a security policy for execution of the container including the containerized application thereof. The security policy specifies the security policy configurations for the plurality of resources used in the execution of the containerized application.

The automatically generating can, in some embodiments, include automatically editing a default security policy that has prior-generated security policy configurations, where the editing changes the prior-generated security policy configurations. In some embodiments, the security policy is specified at least in part using at least one selected from the group consisting of: a pod security policy specification for the container and external admission controller(s) for the container.

The security policy configurations for the plurality of resources can explicitly specify restrictions on any of various resources and usage thereof. Examples include container network stack and port usage ('hostNetwork'), file and volume access ('volumes'), privilege escalation, interprocess communication ('hostIPC'), system calling, and/or sharing of host process identifier namespace ('hostPID').

As noted, a learning aspect may be utilized that learns preferred security configurations from other deployments. FIG. 4B depicts an example process for learning and selecting a preferred security configuration. In specific examples, the containerized application (from FIG. 4A) is to be deployed as part of a cluster in which one or more additional container deployments exist. The process of FIG. 4B includes performing container deployments (414) each time a next deployment is request, and learning (414), from these additional container deployment(s) of the cluster, preferred security configuration(s), for instance a preferred security configuration for a given resource, of the plurality of resources, for which there are multiple options to use as the security configuration for the resource. When generating a security policy for the containerized application (e.g. of FIG. 4A) to be deployed, the process of FIG. 4B can select, as a security configuration for the resource, the learned preferred security configuration of the resource that was learned from the other deployment(s) that have already been deployed. Feedback as to whether specific security configurations implemented for deployments were appropriate and/or provide policies as desired can be obtained after those deployments have been carried out in order to learn which configurations work best and are therefore preferred.

Although various examples are provided, variations are possible without departing from a spirit of the claimed aspects.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 10 contains an example of an environment for the execution of at least some of the computer code involved in performing the inventive methods, such as security policy generation code 36. In addition to block 36, computing environment 10 includes, for example, computer 20, wide area network (WAN) 50, end user device (EUD) 60, remote server 70, public cloud 80, and private cloud 90. In this embodiment, computer 20 includes processor set 22 (including processing circuitry 24 and cache 26), communication fabric 28, volatile memory 30, persistent storage 32 (including operating system 34 and block 36, as identified above), peripheral device set 40 (including user interface (UI) device set 42, storage 44, and Internet of Things (IoT) sensor set 46), and network module 48. Remote server 70 includes remote database 72. Public cloud 80 includes gateway 81, cloud orchestration module 82, host physical machine set 84, virtual machine set 86, and container set 88.

COMPUTER 20 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 72. As is well understood in the art of computer technology, and depending upon the technology, performance of a computer-implemented method may be distributed among multiple computers and/or between multiple locations. On the other hand, in this presentation of computing environment 10, detailed discussion is focused on a single computer, specifically computer 20, to keep the presentation as simple as possible. Computer 20 may be located in a cloud, even though it is not shown in a cloud in FIG. 1. On the other hand, computer 20 is not required to be in a cloud except to any extent as may be affirmatively indicated.

PROCESSOR SET 22 includes one, or more, computer processors of any type now known or to be developed in the future. Processing circuitry 24 may be distributed over multiple packages, for example, multiple, coordinated integrated circuit chips. Processing circuitry 24 may implement multiple processor threads and/or multiple processor cores. Cache 26 is memory that is located in the processor chip package(s) and is typically used for data or code that should be available for rapid access by the threads or cores running on processor set 22. Cache memories are typically organized into multiple levels depending upon relative proximity to the processing circuitry. Alternatively, some, or all, of the cache for the processor set may be located "off chip." In some computing environments, processor set 22 may be designed for working with qubits and performing quantum computing.

Computer readable program instructions are typically loaded onto computer 20 to cause a series of operational steps to be performed by processor set 22 of computer 20 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 26 and the other storage media discussed below. The program instructions, and associated data, are accessed by processor set 22 to control and direct performance of the inventive methods. In computing environment 10, at least some of the instructions for performing the inventive methods may be stored in block 36 in persistent storage 32.

COMMUNICATION FABRIC 28 is the signal conduction paths that allow the various components of computer 20 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 30 is any type of volatile memory now known or to be developed in the future. Examples include dynamic type random access memory (RAM) or static type RAM. Typically, the volatile memory is characterized by random access, but this is not required unless affirmatively indicated. In computer 20, the volatile memory 30 is located in a single package and is internal to computer 20, but, alternatively or additionally, the volatile memory may be distributed over multiple packages and/or located externally with respect to computer 20.

PERSISTENT STORAGE 32 is any form of non-volatile storage for computers that is now known or to be developed in the future. The non-volatility of this storage means that the stored data is maintained regardless of whether power is being supplied to computer 20 and/or directly to persistent storage 32. Persistent storage 32 may be a read only memory (ROM), but typically at least a portion of the persistent storage allows writing of data, deletion of data and re-writing of data. Some familiar forms of persistent storage include magnetic disks and solid state storage devices. Operating system 34 may take several forms, such as various known proprietary operating systems or open source Portable Operating System Interface type operating systems that employ a kernel. The code included in block 36 typically includes at least some of the computer code involved in performing the inventive methods.

PERIPHERAL DEVICE SET 40 includes the set of peripheral devices of computer 20. Data communication connections between the peripheral devices and the other components of computer 20 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 42 may include components such as a display screen, speaker, microphone, wearable devices (such as goggles and smart watches), keyboard, mouse, printer, touchpad, game controllers, and haptic devices. Storage 44 is external storage, such as an external hard drive, or insertable storage, such as an SD card. Storage 44 may be persistent and/or volatile. In some embodiments, storage 44 may take the form of a quantum computing storage device for storing data in the form of qubits. In embodiments where computer 20 is required to have a large amount of storage (for example, where computer 20 locally stores and manages a large database) then this storage may be provided by peripheral storage devices designed for storing very large amounts of data, such as a storage area network (SAN) that is shared by multiple, geographically distributed computers. IoT sensor set 46 is made up of sensors that can be used in Internet of Things applications. For example, one sensor may be a thermometer and another sensor may be a motion detector.

NETWORK MODULE 48 is the collection of computer software, hardware, and firmware that allows computer 20 to communicate with other computers through WAN 50. Network module 48 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 48 are performed on the same physical hardware device. In other embodiments (for example, embodiments that utilize software-defined networking (SDN)), the control functions and the forwarding functions of network module 48 are performed on physically separate devices, such that the control functions manage several different network hardware devices. Computer readable program instructions for performing the inventive methods can typically be downloaded to computer 20 from an external computer or external storage device through a network adapter card or network interface included in network module 48.

WAN 50 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 60 is any computer system that is used and controlled by an end user (for example, a customer of an enterprise that operates computer 20), and may take any of the forms discussed above in connection with computer 20. EUD 60 typically receives helpful and useful data from the operations of computer 20. For example, in a hypothetical case where computer 20 is designed to provide a recommendation to an end user, this recommendation would typically be communicated from network module 48 of computer 20 through WAN 50 to EUD 60. In this way, EUD 60 can display, or otherwise present, the recommendation to an end user. In some embodiments, EUD 60 may be a client device, such as thin client, heavy client, mainframe computer, desktop computer and so on.

REMOTE SERVER 70 is any computer system that serves at least some data and/or functionality to computer 20. Remote server 70 may be controlled and used by the same entity that operates computer 20. Remote server 70 represents the machine(s) that collect and store helpful and useful data for use by other computers, such as computer 20. For example, in a hypothetical case where computer 20 is designed and programmed to provide a recommendation based on historical data, then this historical data may be provided to computer 20 from remote database 72 of remote server 70.

PUBLIC CLOUD 80 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 80 is performed by the computer hardware and/or software of cloud orchestration module 82. The computing resources provided by public cloud 80 are typically implemented by virtual computing environments that run on various computers making up the computers of host physical machine set 84, which is the universe of physical computers in and/or available to public cloud 80. The virtual computing environments (VCEs) typically take the form of virtual machines from virtual machine set 86 and/or containers from container set 88. It is understood that these VCEs may be stored as images and may be transferred among and between the various physical machine hosts, either as images or after instantiation of the VCE. Cloud orchestration module 82 manages the transfer and storage of images, deploys new instantiations of VCEs and manages active instantiations of VCE deployments. Gateway 81 is the collection of computer software, hardware, and firmware that allows public cloud 80 to communicate through WAN 50.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 90 is similar to public cloud 80, except that the computing resources are only available for use by a single enterprise. While private cloud 90 is depicted as being in communication with WAN 50, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 80 and private cloud 90 are both part of a larger hybrid cloud.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
performing automated static analysis of binary code of a containerized application and generating, based on the static analysis, a control-flow graph of expected runtime execution flow of the containerized application, the containerized application providing an expected set of functionality when properly executing;
inferring, from the expected runtime execution flow of the containerized application informed by the control-flow graph, security policy configurations for a plurality of resources used in execution of the containerized application and that suffice for the containerized application to provide the expected set of functionality; and automatically generating, as part of one or more configuration files used in deploying a container having the containerized application for execution, a security policy for execution of the container including the containerized application thereof, the security policy specifying the security policy configurations for the plurality of resources used in the execution of the containerized application.

2. The method of claim 1, wherein the control-flow graph of expected runtime execution flow is an initial control-flow graph, and wherein the method further comprises:

dynamically tracing containerized application execution during runtime based on a parameterized startup of the containerized application execution;

generating one or more runtime traces of the containerized application execution based on the dynamically tracing; and pruning the initial control-flow graph based on the one or more runtime traces to refine the expected runtime execution flow of the containerized application, the pruning providing a pruned control-flow graph, wherein the inferring is made from the refined expected runtime execution flow.

3. The method of claim 1, wherein the inferring comprises identifying different roles associated with the containerized application and permissions to various resources under various execution flow scenarios, and aggregating the different roles and permissions to determine minimum security policy configurations sufficient for the containerized application to provide the expected set of functionality.

4. The method of claim 1, wherein the containerized application is to be deployed as part of a cluster in which one or more additional container deployments exist, and wherein the method further comprises:

learning, from the one or more additional container deployments of the cluster, a preferred security configuration for a resource, of the plurality of resources, for which there are multiple options to use as the security configuration for the resource; and selecting, as the security configuration for the resource, the learned preferred security configuration.

5. The method of claim 1, wherein the security policy configurations for the plurality of resources explicitly specify restrictions on at least one selected from the group consisting of: container network stack and port usage, file and volume access, privilege escalation, interprocess communication, and sharing of host process identifier namespace.

6. The method of claim 1, wherein the automatically generating comprises automatically editing a default security policy having prior-generated security policy configurations, the editing changing the prior-generated security policy configurations.

7. The method of claim 1, wherein the security policy is specified at least in part using at least one selected from the group consisting of:

a pod security policy specification for the container; and external admission controller(s) for the container.

8. A computer system comprising:

a memory; and a processor in communication with the memory, wherein the computer system is configured to perform a method comprising:

performing automated static analysis of binary code of a containerized application and generating, based on the static analysis, a control-flow graph of expected runtime execution flow of the containerized application, the containerized application providing an expected set of functionality when properly executing;

inferring, from the expected runtime execution flow of the containerized application informed by the control-flow graph, security policy configurations for a plurality of resources used in execution of the containerized application and that suffice for the containerized application to provide the expected set of functionality; and automatically generating, as part of one or more configuration files used in deploying a container having the containerized application for execution, a security policy for execution of the container including the containerized application thereof, the security policy specifying the security policy configurations for the plurality of resources used in the execution of the containerized application.

9. The computer system of claim 8, wherein the control-flow graph of expected runtime execution flow is an initial control-flow graph, and wherein the method further comprises:

dynamically tracing containerized application execution during runtime based on a parameterized startup of the containerized application execution;

generating one or more runtime traces of the containerized application execution based on the dynamically tracing; and pruning the initial control-flow graph based on the one or more runtime traces to refine the expected runtime execution flow of the containerized application, the pruning providing a pruned control-flow graph, wherein the inferring is made from the refined expected runtime execution flow.

10. The computer system of claim 8, wherein the inferring comprises identifying different roles associated with the containerized application and permissions to various resources under various execution flow scenarios, and aggregating the different roles and permissions to determine minimum security policy configurations sufficient for the containerized application to provide the expected set of functionality.

11. The computer system of claim 8, wherein the containerized application is to be deployed as part of a cluster in which one or more additional container deployments exist, and wherein the method further comprises:

learning, from the one or more additional container deployments of the cluster, a preferred security configuration for a resource, of the plurality of resources, for which there are multiple options to use as the security configuration for the resource; and selecting, as the security configuration for the resource, the learned preferred security configuration.

12. The computer system of claim 8, wherein the security policy configurations for the plurality of resources explicitly specify restrictions on at least one selected from the group consisting of: container network stack and port usage, file and volume access, privilege escalation, interprocess communication, and sharing of host process identifier namespace.

13. The computer system of claim 8, wherein the automatically generating comprises automatically editing a default security policy having prior-generated security policy configurations, the editing changing the prior-generated security policy configurations.

14. The computer system of claim 8, wherein the security policy is specified at least in part using at least one selected from the group consisting of:

a pod security policy specification for the container; and external admission controller(s) for the container.

15. A computer program product comprising:

a computer readable storage medium readable by a processing circuit and storing instructions for execution by the processing circuit for performing a method comprising:

performing automated static analysis of binary code of a containerized application and generating, based on the static analysis, a control-flow graph of expected runtime execution flow of the containerized application, the containerized application providing an expected set of functionality when properly executing;

inferring, from the expected runtime execution flow of the containerized application informed by the control-flow graph, security policy configurations for a plurality of resources used in execution of the containerized application and that suffice for the containerized application to provide the expected set of functionality; and automatically generating, as part of one or more configuration files used in deploying a container having the containerized application for execution, a security policy for execution of the container including the containerized application thereof, the security policy specifying the security policy configurations for the plurality of resources used in the execution of the containerized application.

16. The computer program product of claim 15, wherein the control-flow graph of expected runtime execution flow is an initial control-flow graph, and wherein the method further comprises:

dynamically tracing containerized application execution during runtime based on a parameterized startup of the containerized application execution;

generating one or more runtime traces of the containerized application execution based on the dynamically tracing; and pruning the initial control-flow graph based on the one or more runtime traces to refine the expected runtime execution flow of the containerized application, the pruning providing a pruned control-flow graph, wherein the inferring is made from the refined expected runtime execution flow.

17. The computer program product of claim 15, wherein the inferring comprises identifying different roles associated with the containerized application and permissions to various resources under various execution flow scenarios, and aggregating the different roles and permissions to determine minimum security policy configurations sufficient for the containerized application to provide the expected set of functionality.

18. The computer program product of claim 15, wherein the containerized application is to be deployed as part of a cluster in which one or more additional container deployments exist, and wherein the method further comprises:

learning, from the one or more additional container deployments of the cluster, a preferred security configuration for a resource, of the plurality of resources, for which there are multiple options to use as the security configuration for the resource; and selecting, as the security configuration for the resource, the learned preferred security configuration.

19. The computer program product of claim 18, wherein the security policy configurations for the plurality of resources explicitly specify restrictions on at least one selected from the group consisting of: container network stack and port usage, file and volume access, privilege escalation, interprocess communication, and sharing of host process identifier namespace.

20. The computer program product of claim 15, wherein the security policy is specified at least in part using at least one selected from the group consisting of:

a pod security policy specification for the container; and external admission controller(s) for the container.

* * * * *